(12) United States Patent
Daniels

(10) Patent No.: US 6,888,849 B2
(45) Date of Patent: May 3, 2005

(54) METHOD FOR EVALUATING CAPACITY UTILIZATION OF A TERMINUS IN A COMMUNICATION SYSTEM

(75) Inventor: William Rudolph Daniels, Warrenville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 868 days.

(21) Appl. No.: 09/882,968

(22) Filed: Jun. 15, 2001

(65) Prior Publication Data

US 2003/0012227 A1 Jan. 16, 2003

(51) Int. Cl.$^7$ .................................................. H04J 1/00
(52) U.S. Cl. ....................... 370/485; 370/252; 370/465; 370/535
(58) Field of Search ................................ 370/252, 465, 370/535, 541, 485, 463, 537, 538, 540, 543, 544, 545, 468; 375/222

(56) References Cited

U.S. PATENT DOCUMENTS

| | | | |
|---|---|---|---|
| 6,195,355 B1 * | 2/2001 | Demizu | 370/397 |
| 6,314,102 B1 * | 11/2001 | Czerwiec et al. | 370/395.6 |
| 6,477,595 B1 * | 11/2002 | Cohen et al. | 710/105 |
| 6,529,479 B1 * | 3/2003 | Suzuki | 370/236.1 |
| 6,597,689 B1 * | 7/2003 | Chiu et al. | 370/354 |
| 6,771,673 B1 * | 8/2004 | Baum et al. | 370/535 |

* cited by examiner

Primary Examiner—Ajit Patel
Assistant Examiner—Andrew C Lee

(57) ABSTRACT

A method for evaluating capacity utilization of a terminus in a communication system where the terminus has a maximum capacity and accommodates a plurality of communication lines in coupled relationship with the terminus, includes the steps of: (a) identifying the plurality of communication lines; each respective line has a respective line speed and a respective character-type that is one character-type of a plurality of character-types extant in the communication system; (b) identifying the respective line speed and the respective character-type for each respective line; (c) determining type line speed contribution by respective lines having a particular the respective character-type; (d) summing the type line speed contribution by all the respective character-types to determine a total line speed contribution for all of the plurality of lines; and (e) comparing the total line speed contribution with the maximum capacity to effect the evaluating.

8 Claims, 2 Drawing Sheets

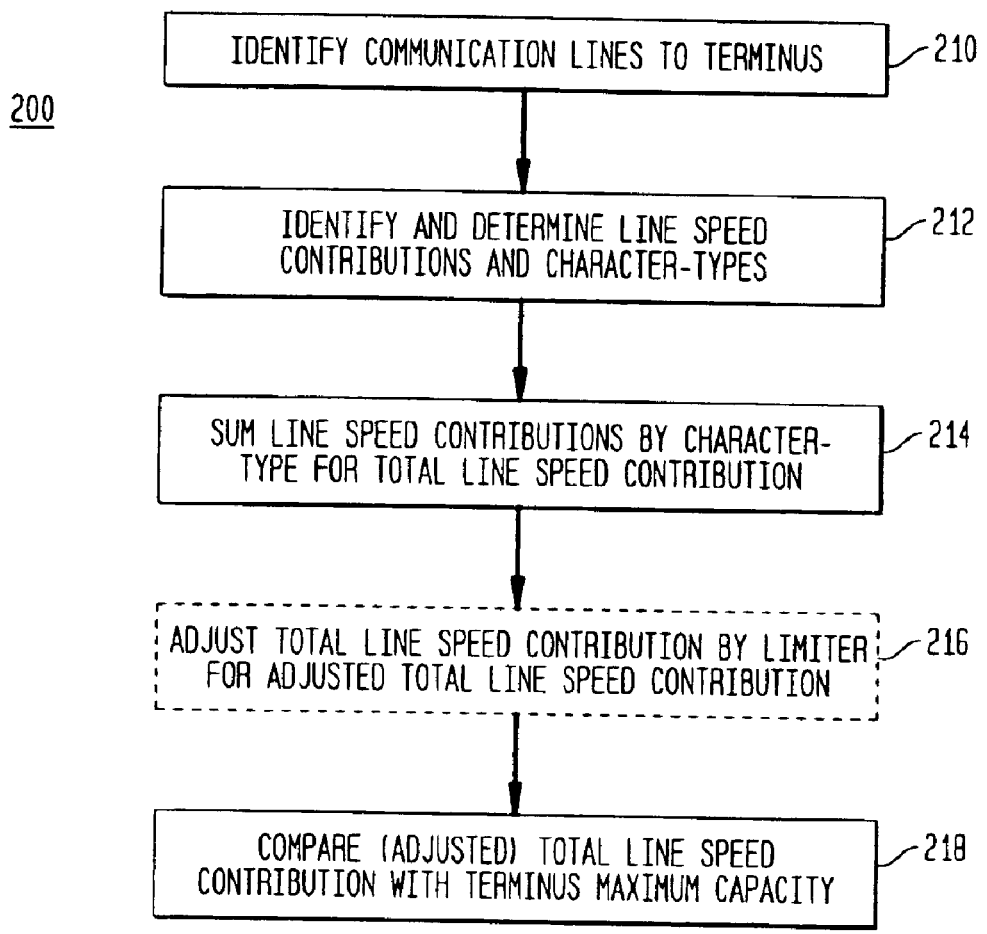

METHOD FOR EVALUATING CAPACITY UTILIZATION OF A TERMINUS IN A COMMUNICATION SYSTEM

BACKGROUND OF THE INVENTION

The present invention is directed to communication systems, and especially to a method for evaluating capacity utilization of particular apparatuses in a telecommunication system.

With the introduction of high-speed, communication lines, such as ADSL (Asymmetric Digital Subscriber Line), users may transmit and receive information much more quickly than was possible using older technologies, such as conventional 56 Kbps (kilobits per second) modems. Typical data rates associated with newer high-speed technology lines are in the megabits per second range. In order to save costs, high speed lines are commonly multiplexed together into a larger transmission facility or large bandwidth "pipe" for transmission into a network by a communication switch, such as an ATM (Asynchronous Transfer Mode) switch.

When information transferred via communication lines is data files, such as computer data files, there is no real-time aspect necessary for transmission of the data. That is, if the data is delayed in transmission, such as when data bits are dropped and information needs to be sent again, a user is not aware of the delay that is necessarily incurred.

Nowadays more and more delay-sensitive information is being transferred over communication lines and delays cannot be tolerated. Examples of such delay-sensitive information include voice information sent over a data network such as the Internet (i.e., voice over IP) and real time video transfer, such as video streaming. If a portion of the data associated with information transfer involving such applications is delayed, the aberration resulting in the received information is immediately noticeable by a party receiving the information.

There is a need for a method for use by a communication system designer to be able to ascertain how many high-speed lines can be accommodated by a terminus in a communication system before the bandwidth capability of the terminus is exhausted. Specifically, by way of example and not by way of limitation, a communication system designer needs a method for determining how may ADSL lines can be handled or accommodated by a multiplexer unit for provision to an ATM switch for transmission into a telecommunication network before the capacity or bandwidth of the multiplexer unit is surpassed.

SUMMARY OF THE INVENTION

A method for evaluating capacity utilization of a terminus in a communication system where the terminus has a maximum capacity and accommodates a plurality of communication lines in coupled relationship with the terminus, includes the steps of: (a) identifying the plurality of communication lines; each respective communication line of the plurality of communication lines has a respective line speed and a respective character-type; the respective character-type is one character-type of a plurality of character-types extant in the communication system; (b) identifying the respective line speed and the respective character-type for each respective communication line; (c) determining type line speed contribution by respective communication lines having a particular the respective character-type; (d) summing the type line speed contribution by all the respective character-types to determine a total line speed contribution for all of the plurality of communication lines; and (e) comparing the total line speed contribution with the maximum capacity to effect the evaluating.

In one embodiment of the invention, the method further includes an interim step following step (d) and preceding step (e): (d) (1) adjusting the total line speed contribution by a limiter factor to determine an adjusted total line speed contribution for all of the plurality of communication lines. The limiter factor establishes a limit regarding the number of the plurality of communication lines that operate simultaneously. This alternate embodiment of the invention alters step (e) to require comparing the adjusted total line speed contribution with the maximum capacity to effect the evaluating.

Both embodiments of the invention may be manifested in a terminus in a telecommunication system apparatus for selectively coupling respective telecommunication lines with at least one telecommunication switching apparatus.

It is, therefore, an object of the present invention to provide a method for evaluating capacity utilization of a terminus in a communication system before the bandwidth capability of the terminus is exhausted.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 2 is a flow diagram illustrating the practice of the present invention.

DETAILED DESCRIPTION OF THE PREFERRED EMBODIMENT

Figure 1:
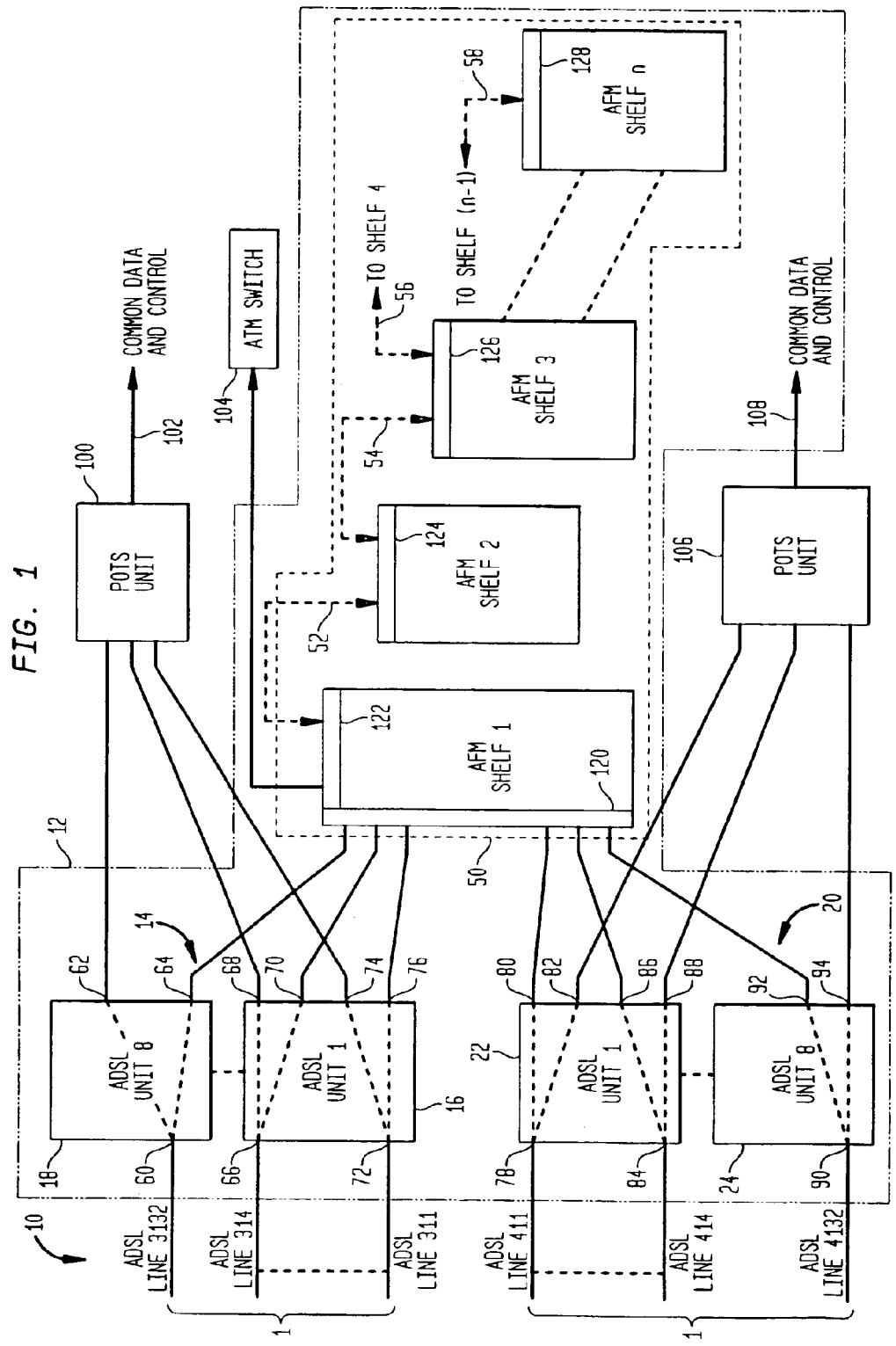
FIG. 1 is a schematic block diagram of a portion of a telecommunication system with which the present invention may be advantageously employed.

The method of the present invention provides solutions to two dilemmas: (1) how many communication lines can be coupled with a communication terminus before the capacity or bandwidth of the terminus is exhausted, and (2) if the communication lines to be coupled with the terminus have different delay sensitivities, how do their differences impact the capacity of the terminus.

The second dilemma deals with the issue of sensitivity of transmitted data to delays. Certain types of data are sensitive to delays; they cannot be delayed without disruption resulting. Examples of such delay-sensitive information include voice over IP and video streaming. The second dilemma requires that the method must be capable of taking into account various classes of service that can be assigned to a communication line. For example, in the case of ADSL systems, several standards committees have developed a designation system for identifying ADSL lines based upon the tolerance of an ADSL line to tolerate delay in data transmission. ATM Forum UNI4.0 has published five levels of ADSL line classes based upon tolerance of an ADSL line's data transmission priority requirements. The levels are referred to as Quality of Service (QoS) levels. From highest level of service to lowest level of service: [1] CBR (Constant Bit Rate), [2] rt-VBR (real time-Variable Bit Rate), [3] nrt-VBR (non real time-Variable Bit Rate), [4] UBR (Unspecified Bit Rate) and [5] ABR (Available Bit Rate). Service Levels [1] and [2] are the levels associated with delay-sensitive information transfers, such as voice over IP or video streaming. Service levels [3] through [5] permit some delay interruptions in transmission of information. Quality of Service levels are one parameter that may be used in practicing the method of the present invention to evaluate capacity utilization of communication equipment.

Another parameter employed in evaluating capacity utilization of equipment is PAR (Peak to Average Ratio), sometimes referred to as the overbooking factor. The PAR is used to assign levels of restrictions on concentrations of line types in the available capacity or bandwidth of a device, such as a communications terminus.

Given the QoS (Quality of Service) rankings and the concept of PAR (Peak to Average Ratio), a designer may, for example, assign a PAR of 10:1 to a communication line classified as a UBR (Unspecified Bit Rate) line type or as an ABR (Available Bit Rate) line type. That is, ten UBR/ABR lines would be permitted to contend for one unit of bandwidth. On the other hand, for example, if a communication line is classified as a CBR (Constant Bit Rate) line type, it may be assigned a PAR of 1:1, thereby assuring that the CBR line is allocated its own unit of bandwidth and need not contend for capacity. By such a provision, contention for bandwidth would not contribute to delay on the CBR line type.

Enabling a designer to provide for a 10:1 bandwidth sharing arrangement (for lower levels of QoS) saves significant investment in equipment costs because it permits installing only one-tenth the amount of equipment for coupling communication lines with network switches. Moreover, the method of the present invention allows a designer to mix various levels of delay sensitive communication lines to determine the most efficient use of capacity or bandwidth.

Yet another parameter employed in evaluating capacity utilization of equipment is a Line Activity Factor that indicates of the percentage of lines that can be active (i.e., using capacity or bandwidth) at a given time. This parameter operates as a limiter that is commonly selected by a designer or user and is preferably based upon observed communication traffic performance in the system being evaluated. The limiter may be regarded as operating as a safety factor to help preclude overtaxing the terminus being evaluated.

Using the parameters described one can employ the following expression to evaluate a system:

$$BW = (A+B+C+D+E) \cdot L_{ACTIVE} \quad [1]$$

where

A, B, C, D are Contribution Factors, determined as described below; and $L_{ACTIVE}$ is the Line Activity Factor.

Contribution Factors A, B, C, D are determined:

$$A = \left( \frac{\#Lines_{CBR} * Bandwidth_{CBR}}{PAR_{CBR}} \right) \quad [2]$$

$$B = \left( \frac{\#Lines_{rtVBR} * Bandwidth_{rtVBR}}{PAR_{rtVBR}} \right) \quad [3]$$

$$C = \left( \frac{\#Lines_{nrtVBR} * Bandwidth_{nrtVBR}}{PAR_{nrtVBR}} \right) \quad [4]$$

$$D = \left( \frac{\#Lines_{UBR} * Bandwidth_{UBR}}{PAR_{UBR}} \right) \quad [5]$$

-continued $$E = \left( \frac{\#Lines_{ABR} * Bandwidth_{ABR}}{PAR_{ABR}} \right) \quad [6]$$

An exemplary exercise of the method of the present invention will be presented in the context of an ADSL (Asymmetric Digital Subscriber Line) system.

FIG. 1 is a schematic block diagram of a portion of a telecommunication system with which the present invention may be advantageously employed. In FIG. 1, a plurality of ADSL (Asymmetric Digital Subscriber Line) lines 10 are provided to a multiplexer unit 12. Multiplexer unit 12 includes a plurality of ADSL units arranged to receive the plurality of ADSL lines 10 and an AFM (ADSL Feeder Multiplexer) unit 50. In order to simplify the illustration of FIG. 1, representative ADSL units are presented. Thus, a first group 14 of ADSL units, represented by a first ADSL unit 16 and a last ADSL unit 18, includes accommodations for coupling 32 ADSL lines. That is first ADSL unit 16 receives ADSL lines 311 through 314 of a first set of ADSL lines 31 among the plurality of ADSL lines 10. Last ADSL unit 18 receives lines 3129 (not shown in FIG. 1) through 3132 of first set 31 of ADSL lines. There are other ADSL units that handle ADSL lines 315 through 3128 (not shown in FIG. 1). ADSL units such as first ADSL unit 16, last ADSL unit 18 and other ADSL units (not shown in FIG. 1) may be configured to handle a greater or fewer number of ADSL lines than four each, if desired.

A second group 20 of ADSL units, represented by a first ADSL unit 22 and a last ADSL unit 24, includes accommodations for coupling an additional 32 ADSL lines. That is first ADSL unit 20 receives ADSL lines 411 through 414 of a second set of ADSL lines 41 among the plurality of ADSL lines 10. Last ADSL unit 24 receives lines 4129 (not shown in FIG. 1) through 4132 of second set 41 of ADSL lines. There are other ADSL units that handle ADSL lines 415 through 4128 (not shown in FIG. 1). ADSL units such as first ADSL unit 20, last ADSL unit 24 and other ADSL units (not shown in FIG. 1) may be configured to handle a greater or fewer number of ADSL lines than four each, if desired.

ADSL units 18, 16, 22, 24 (and associated ADSL units not shown in FIG. 1) are coupled with AFM (ADSL Feeder Multiplexer) unit 50. AFM unit 50 is arranged on a plurality of AFM Shelves, designated AFM Shelf 1, AFM Shelf 2, AFM Shelf 3, AFM Shelf n. AFM Shelf 1, AFM Shelf 2, AFM Shelf 3, AFM Shelf n are interconnected via couplings 52, 54, 56, 58 to facilitate routing communications among AFM Shelf 1, AFM Shelf 2, AFM Shelf 3, AFM Shelf n as necessary to accommodate communications received via the plurality of ADSL lines 10 for forwarding to an ATM (Asynchronous Transfer Mode) communication switch 104. Inter-shelf couplings 52, 54, 56, 58 represent the intershelf arrangements required that may be embodied in network-type coupling arrangements, parallel-type coupling arrangements, serial-type or "daisy chain" coupling arrangements or a combination of such coupling arrangements. Each ADSL 18, 16, 22, 24 (and associated ADSL units not shown in FIG. 1) is preferably configured for splitting communications received via an ADSL line into two basic components: a voice component and a data component.

A communication received, for example, via ADSL line 3132 at a juncture 60 may be split into a voice component delivered to a juncture 62 and into a data component delivered to a juncture 64. The voice component is transferred from juncture 62 to a POTS (Plain Old Telephone System) unit 100. The data component is transferred from juncture 64 to AFM unit 50. A portion of the voice communication component received from juncture 62 by POTS unit 100 includes common data and control information that may be routed onward for facilitating routing and other features associated with the voice communications, as indicated by a routing arrow indicator 102. AFM unit 50 processes the data component received from juncture 64 and transfers the data component to an ATM (Asynchronous Transfer Mode) communications data switch 104 for further transfer to a communication network, such as a telecommunication network (not shown in FIG. 1).

A communication received via ADSL line 314 at a juncture 66 may be split into a voice component delivered to a juncture 68 and into a data component delivered to a juncture 70. The voice component is transferred from juncture 68 to POTS (Plain Old Telephone System) unit 100. The data component is transferred from juncture 70 to AFM unit 50. A portion of the voice communication component received from juncture 68 by POTS unit 100 includes common data and control information that may be routed onward for facilitating routing and other features associated with the voice communications, as indicated by routing arrow indicator 102. AFM unit 50 processes the data component received from juncture 70 and transfers the data component to ATM (Asynchronous Transfer Mode) communications data switch 104 for further transfer to a communication network, such as a telecommunication network (not shown in FIG. 1).

A communication received via ADSL line 311 at a juncture 72 may be split into a voice component delivered to a juncture 74 and into a data component delivered to a juncture 76. The voice component is transferred from juncture 74 to POTS (Plain Old Telephone System) unit 100. The data component is transferred from juncture 76 to AFM unit 50. A portion of the voice communication component received from juncture 74 by POTS unit 100 includes common data and control information that may be routed onward for facilitating routing and other features associated with the voice communications, as indicated by routing arrow indicator 102. AFM unit 50 processes the data component received from juncture 76 and transfers the data component to ATM (Asynchronous Transfer Mode) communications data switch 104 for further transfer to a communication network, such as a telecommunication network (not shown in FIG. 1).

A communication received via ADSL line 411 at a juncture 78 may be split into a voice component delivered to a juncture 82 and into a data component delivered to a juncture 80. The voice component is transferred from juncture 82 to a POTS (Plain Old Telephone System) unit 106. The data component is transferred from juncture 80 to AFM unit 50. A portion of the voice communication component received from juncture 82 by POTS unit 106 includes common data and control information that may be routed onward for facilitating routing and other features associated with the voice communications, as indicated by a routing arrow indicator 108. AFM unit 50 processes the data component received from juncture 80 and transfers the data component to ATM (Asynchronous Transfer Mode) communications data switch 104 for further transfer to a communication network, such as a telecommunication network (not shown in FIG. 1).

A communication received via ADSL line 414 at a juncture 84 may be split into a voice component delivered to a juncture 88 and into a data component delivered to a juncture 86. The voice component is transferred from juncture 88 to POTS (Plain Old Telephone System) unit 106. The data component is transferred from juncture 86 to AFM unit 50. A portion of the voice communication component received from juncture 88 by POTS unit 106 includes common data and control information that may be routed onward for facilitating routing and other features associated with the voice communications, as indicated by routing arrow indicator 108. AFM unit 50 processes the data component received from juncture 86 and transfers the data component to ATM (Asynchronous Transfer Mode) communications data switch 104 for further transfer to a communication network, such as a telecommunication network (not shown in FIG. 1).

A communication received via ADSL line 4132 at a juncture 90 may be split into a voice component delivered to a juncture 94 and into a data component delivered to a juncture 92. The voice component is transferred from juncture 94 to POTS (Plain Old Telephone System) unit 106. The data component is transferred from juncture 92 to AFM unit 50. A portion of the voice communication component received from juncture 94 by POTS unit 106 includes common data and control information that may be routed onward for facilitating routing and other features associated with the voice communications, as indicated by routing arrow indicator 108. AFM unit 50 processes the data component received from juncture 92 and transfers the data component to ATM (Asynchronous Transfer Mode) communications data switch 104 for further transfer to a communication network, such as a telecommunication network (not shown in FIG. 1).

An interface unit 120 is situated between lines from junctures 64, 70, 76, 80, 86, 92 and AFM unit 50, specifically between lines from junctures 64, 70, 76, 80, 86, 92 and AFM Shelf 1. Other interface units are situated in terminating relationship with couplings 52, 54, 56, 58 to facilitate intershelf coupling among AFM Shelf 1, AFM Shelf 2, AFM Shelf 3, AFM Shelf n. The present invention is useful in determining the capacity of ADSL lines in plurality of ADSL lines 10 vis-à-vis capacity of interface unit 120. When interface unit 120 is embodied in a modular architecture with each respective module of the architecture having a predetermined capacity, the present invention is especially useful in ascertaining how many modules are required for handling the data volume expected to be received by AFM unit 50. The present invention is also useful for evaluating traffic load levels as they require modules making up interface units 122, 124, 126, 128 for effecting inter-shelf coupling among AFM Shelf 1, AFM Shelf 2, AFM Shelf 3, AFM Shelf n.

In presenting an exemplary exercise of the method of the present invention in the context of an ADSL (Asymmetric Digital Subscriber Line) system, one must keep in mind certain practical parameters associated with ADSL systems. For example, in full service ADSL systems, the data rate upstream (from a subscriber towards an associated switch) can be a maximum of 1 Mbps (megabit per second) and a downstream data rate (from a switch to a subscriber) is a maximum of 6.144 Mbps.

Further, in ADSL systems, the line data rate of a signal is affected by the length, gauge and condition of the copper pair carrying signals. The condition of the copper pair includes, for example, whether there are bridge taps or line repeaters in the loop between the switch and the subscriber. Exemplary figures for 26-gauge copper wire are:

| Maximum Data Rate | Length of Loop |
|---|---|
| 1.544 Mbps | 18,000 feet |
| 2.048 Mbps | 16,000 feet |
| 6.312 Mbps | 12,000 feet |

Exemplary exercises of the method of the present invention are offered below in which the following assumptions are imposed: For high priority lines (i.e., CBR and rt-VBR lines), PAR is assigned as 1:1. For other lines of lower priority (i.e., nrt-VBR, UBR and ABR lines) PAR is assigned as 10:1. $L_{ACTIVE}$ (Line Activity Factor) or limiter is 0.25.

In order to simplify the example, two line types are employed: Type A lines cannot tolerate delay (QoS is CBR or rt-VBR). Type B lines can tolerate delay (QoS is nrt-VBR, UBR or ABR).

Capacity of the terminus in the exemplary exercise of the method is established using multiplexer circuit packs having capacity to handle what are known as DS3/E3 digital lines.

DS3 is a transmission signal that is part of the North American Digital Signal level hierarchy of which the lowest level, DS0 is conveyed at a data rate of 64 Kbps. A DS3 transmission signal is conveyed at a data rate of 44.736 Mbps. E3 is a digital signal which is part of the CEPT (Conference des Administrations Europeenes des Postes et Telecommunications; a European standards committee) digital signal level hierarchy of which the lowest level, E0 is conveyed at a data rate of 64 Kbps. An E3 transmission signal is conveyed at a data rate of 34 Mbps.

Thus, an evaluation of capacity utilization of an ADSL communication system may be effected using the method of the present invention by evaluating Expression [1] above, adapted for the present example:

$$\left[\left(\frac{\#Lines_{TypeA} * Bandwidth_{TypeA}}{PAR_{TypeA}}\right)\left(\frac{\#Lines_{TypeB} * Bandwidth_{TypeB}}{PAR_{TypeB}}\right)\right] * L_{ACTIVE} = BW \quad [7]$$

That is:

$$\left[\left(\frac{\#Lines_{TypeA} * LineSpeed_{TypeA}}{1}\right) \right.$$
$$\left.\left(\frac{\#Lines_{TypeB} * LineSpeed_{TypeB}}{10}\right)\right] * 0.25 = BW \quad [8]$$

EXAMPLE 1

There are 500 ADSL lines that need to be connected with an ADSL terminus in a telecommunication system. A designer must determine how many DS3/E3 multiplexer circuit packs must be employed to handle the 500 ADSL lines. The 500 lines have the following QoS parameters and line speeds:

50 ADSLs with QoS of CBR at line speed of 2 Mbps;
100 ADSLs with QoS of rt-VBR at line speed of 0.065 Mbps;
100 ADSLs with QoS of UBR at line speed of 2 Mbps;
150 ADSLs with QoS of ABR at line speed of 0.0654 Mbps; and
100 ADSLs with QoS of nrt-VBR at line speed of 0.028 Mbps.

Step 1:
Determine the contribution of the total line speed associated with Type A lines.

50·2 Mbps=100 Mbps
100·0.065 Mbps=6.5 Mbps
Total contribution of Type A lines:

Σ Type A lines=100 Mbps+6.5 Mbps=106.5 Mbps

Step 2:
Determine the contribution of the total line speed associated with Type B lines.

100·2 Mbps=200 Mbps
150·0.06654 Mbps=9.98 Mbps
100·0.028 Mbps=2.8 Mbps
Total contribution of Type B lines:

Σ Type B lines=200 Mbps+9.8 Mbps+2.8 Mbps=212.6 Mbps

Step 3:
From expression [8]:

$$((106.5 \text{ Mbps})+(212.6 \text{ Mbps}/10))\cdot 0.25 = 31.94 \text{ Mbps} \quad [9]$$

Evaluation:
The resultant value is less than the E3 data rate of 34 Mbps and is less than the DS3 data rate of 45 Mbps. Therefore, one DS3/E3 multiplexer circuit pack suffices to couple the ADSL lines with the terminus.

EXAMPLE 2

A designer has 500 ADSL lines as follows:
5% of the ADSL lines require 6.312 Mbps; all are Type B.
20% of the ADSL lines require 2.048 Mbps; 10% are Type A; 90% are Type B.
75% of the ADSL lines require 1.544 Mbps; 20% are Type A; 80% are Type B.

Step 1:
The ADSL lines may be represented as follows
25 ADSL lines at 6.312 Mbps per ADSL=157.8 Mbps Type B
10 ADSL lines at 2.048 Mbps per ADSL=20.48 Mbps Type A
90 ADSL lines at 2.048 Mbps per ADSL=184.32 Mbps Type B
75 ADSL lines at 1.544 Mbps per ADSL=115.8 Mbps Type A
300 ADSL lines at 1.544 Mbps per ADSL=463.28 Mbps Type B Step 2:

Σ Type A lines=20.48+115.8=136.26. Mbps

Σ Type B lines=157.8+184.32+463.2=805.32 Mbps

Step 3:
From expression [8]:

$$((136.26 \text{ Mbps})+(805.32 \text{ Mbps}/10))\cdot 0.25 = 54.2 \text{ Mbps} \quad [10]$$

Evaluation:
The resultant value is more than the E3 data rate of 34 Mbps and is more than the DS3 data rate of 45 Mbps. Therefore, two DS3/E3 multiplexer circuit packs must be employed to couple the ADSL lines wit FIG. 2 is a flow diagram illustrating the practice of the present invention. In FIG. 2, a method 200 for evaluating capacity utilization of a terminus in a communication system is illustrated. The terminus has a maximum capacity and accommodates a plurality of communication lines in coupled relationship with the terminus. Each respective communication line of the plurality of communication lines has a respective line speed and a respective character-type. The respective character-type of a communication line is one character-type of a plurality of character-types extant in the communication system.

Method 200 begins with the step of identifying the plurality of communication lines that are coupled with or to be coupled with the terminus being evaluated, as indicated by a block 210. Method 200 continues with the step of identifying and determining the respective line speed and the respective character-type for each of the respective communication lines, as indicated by a block 212.

Method 200 continues with summing the line speed contributions by all the respective character-types of communication lines to determine a total line speed contribution for all of the plurality of communication lines coupled with the terminus, as indicated by a block 214.

Method 200 may include an additional step of adjusting the total line speed contribution calculated according to the step indicated by block 214 by a limiter for determining an adjusted total line speed contribution, as indicated by a block 216. The limiter factor establishes a limit regarding the number of communication lines that operate simultaneously. The limiter may be regarded as operating as a safety factor to help preclude overtaxing the terminus being evaluated. That is, the limiter is an indication that less than full employment of the terminus' capacity is to be used during operations. The alternative nature of the step indicated by block 216 is indicated by illustrating block 216 using a dotted line.

Method 200 continues by comparing the total line speed contribution with the maximum capacity of the terminus to complete evaluation of the terminus, as indicated by a block 218. If the step indicated by block 216 is incorporated into the practice of the method, then block 218 represents comparing the adjusted total line speed contribution with the maximum capacity of the terminus to complete evaluation of the terminus. The impact of the alternative nature of the step indicated by block 216 is indicated in block 218 by including the term "adjusted" in parentheses.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for evaluating capacity utilization of a terminus in a communication system; said terminus having a maximum capacity and accommodating a plurality of communication lines in coupled relationship with said terminus; each respective communication line of said plurality of communication lines having a respective line speed and a respective character-type; said respective character-type being one character-type of a plurality of character-types extant in said communication system; the method comprising the steps of:

(a) identifying said plurality of communication lines;

(b) identifying said respective line speed and said respective character-type for each said respective communication line;

(c) determining type line speed contribution by respective said communication lines having a particular said respective character-type;

(d) summing said type line speed contribution by all said respective character-types to determine a total line speed contribution for all of said plurality of communication lines; and (e) comparing said total line speed contribution with said maximum capacity to effect said evaluating.

2. A method for evaluating capacity utilization of a terminus in a communication system as recited in claim 1 wherein the method further includes an interim step following step (d) and preceding step (e); said interim step comprising:

(d) (1) adjusting said total line speed contribution by a limiter factor to determine an adjusted total line speed contribution for all of said plurality of communication lines; said limiter factor establishing a limit regarding the number of said plurality of communication lines that operate simultaneously;

and wherein step (e) comprises comparing said adjusted total line speed contribution with said maximum capacity to effect said evaluating.

3. A method for evaluating capacity utilization of a terminus in a communication system as recited in claim 1 wherein said communication system is a telecommunication system and wherein said terminus includes a multiplexing apparatus for selectively coupling said respective communication lines with at least one telecommunication switching apparatus.

4. A method for evaluating capacity utilization of a terminus in a communication system as recited in claim 2 wherein said communication system is a telecommunication system and wherein said terminus includes a multiplexing apparatus for selectively coupling said respective communication lines with at least one telecommunication switching apparatus.

5. A method for determining a configuration for a terminus in a communication system; said terminus being constructed for having a design capacity for accommodating a plurality of communication lines in coupled relation with said terminus; said design capacity being established by employing at least one interface unit; each interface unit of said at least one interface unit having a predetermined capacity; each respective communication line of said plurality of communication lines having a respective line speed and a respective character-type; said respective character-type being one character-type of a plurality of character-types extant in said communication system; the method comprising the steps of:

(a) identifying said plurality of communication lines;

(b) identifying said respective line speed and said respective character-type for each said respective communication line;

(c) determining type line speed contribution by respective said communication lines having a particular said respective character-type;

(d) summing said type line speed contribution by all said respective character-types to determine a total line speed contribution for all of said plurality of communication lines; and (e) comparing said total line speed contribution with said predetermined capacity to determine how many said interface units are required to achieve said design capacity.

6. A method for determining a configuration for a terminus in a communication system as recited in claim 5 wherein the method further includes an interim step following step (d) and preceding step (e); said interim step comprising:

(d) (1) adjusting said total line speed contribution by a limiter factor to determine an adjusted total line speed contribution for all of said plurality of communication lines; said limiter factor establishing a limit regarding the number of said plurality of communication lines that operate simultaneously;

and wherein step (e) comprises comparing said adjusted total line speed contribution with said predetermined capacity to determine how many said interface units are required to achieve said design capacity.

7. A method for determining a configuration for a terminus in a communication system as recited in claim 5 wherein said communication system is a telecommunication system and wherein said terminus includes a multiplexing apparatus for selectively coupling said respective communication lines with at least one telecommunication switching apparatus.

8. A method for determining a configuration for a terminus in a telecommunication system as recited in claim 6 wherein said communication system is a telecommunication system and wherein said terminus includes a multiplexing apparatus for selectively coupling said respective communication lines with at least one telecommunication switching apparatus.

* * * * *